US007436799B2

(12) United States Patent
El-Sayed et al.

(10) Patent No.: US 7,436,799 B2
(45) Date of Patent: Oct. 14, 2008

(54) METHOD FOR MINIMIZING EXPENDITURES ASSOCIATED WITH OPTIMIZED BACKHAUL NETWORKS

(75) Inventors: Mohamed Lotfy El-Sayed, Red Bank, NJ (US); Amit Mukhopadhyay, Westfield, NJ (US); Zulfiquar Sayeed, Hightstown, NJ (US); Carlos Urrutia-Valdes, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 453 days.

(21) Appl. No.: 11/241,750

(22) Filed: Sep. 30, 2005

(65) Prior Publication Data

US 2007/0077933 A1 Apr. 5, 2007

(51) Int. Cl.
*H04Q 7/00* (2006.01)

(52) U.S. Cl. ....................... 370/328; 370/229; 370/230; 455/452.1; 455/446; 709/220

(58) Field of Classification Search ................. 370/328, 370/229, 230; 455/452.1, 446; 709/220
See application file for complete search history.

(56) References Cited

U.S. PATENT DOCUMENTS

2002/0120768 A1* 8/2002 Kirby et al. ................. 709/235
2003/0086422 A1* 5/2003 Klinker et al. .............. 370/389
2003/0088671 A1* 5/2003 Klinker et al. .............. 709/225
2004/0190448 A1* 9/2004 Fishteyn et al. ............. 370/229
2005/0055440 A1* 3/2005 Marilly et al. .............. 709/224
2005/0188059 A1* 8/2005 Manthoulis et al. ......... 709/220
2006/0165009 A1* 7/2006 Nguyen et al. .............. 370/252
2006/0187829 A1* 8/2006 Heiner et al. ............... 370/229
2007/0189180 A1* 8/2007 Schelen et al. .............. 370/252

* cited by examiner

*Primary Examiner*—Danh C Le

(57) ABSTRACT

The invention includes a method for determining an expenditure associated with a network. A method includes obtaining network information associated with a portion of a network, categorizing each of a respective plurality of cells as one of an aggregated cell and a non-aggregated cell, determining an aggregating node configuration for at least one aggregating node associated with at least one base station associated with an aggregated cell, determining a deaggregating node configuration for at least one deaggregating node associated with at least one of the at least one aggregating node, and determining the expenditure according to at least one of the aggregating node configuration and the deaggregating node configuration. The categorization of cells is performed using the network information.

22 Claims, 8 Drawing Sheets

METHOD FOR MINIMIZING EXPENDITURES ASSOCIATED WITH OPTIMIZED BACKHAUL NETWORKS

FIELD OF INVENTION

The invention relates to the field of wireless communication networks and, more specifically, to optimization of wireless backhaul networks.

DESCRIPTION OF THE BACKGROUND ART

In wireless networks, backhaul refers to transmission facilities for carrying traffic from a base station associated with a wireless antenna to a network controller such as a base station controller. In general, backhaul traffic is transported over T1, E1, and similar links deployed between the base station and the network controller. Wireless service providers typically pay local service providers leased-line expenses for such backhaul links. Typically, such charges depend on the distances between the base stations and the associated network controllers. Therefore, most wireless service providers face large recurring operational expenses for providing backhaul transport.

A number of tools for analyzing backhaul network transport expenses have been developed. Unfortunately, such tools require enormous quantities of information, such as locations of base stations, traffic demands per base station and the like. The gathering, processing and analysis of such information is tedious and time-consuming and, therefore, expensive. Gathering of such information is especially difficult for an equipment vendor without an embedded base of products in the wireless service provider network. Furthermore, much of the required input information is sensitive information that many wireless service providers are unwilling to disclose to the equipment vendor performing the backhaul network transport expense analysis.

SUMMARY OF THE INVENTION

The invention addresses a need for determining expenditures for each base station of, illustratively, a backhaul network such that the expenditures may be reduced. To this end, a backhaul network is modeled using a hierarchical representation in which a wireless network is represented as being made up of one or more regions, each of which has representative traffic demands and a subscriber density. The hierarchical representation is established such that each base station in a region is assumed to have similar traffic demands and subscriber density. Advantageously, by assuming similar traffic demands and subscriber densities across all base stations in a region, the need to collect, process, and analyze detailed location information, traffic information, and the like for each base station is avoided.

In the hierarchical representation, each region of the network is further divided into clusters, where each cluster includes a plurality of cells and each cell includes an associated base station. Each cell in a cluster is categorized as one of an aggregated cell and a non-aggregated cell. An aggregated cell is a cell for which traffic from the base station associated with that cell is aggregated, by an aggregating node, with traffic from other base stations located within other nearby aggregated cells. The traffic aggregated by the aggregating node from associated aggregated cells, usually cells located within a particular cluster, is transported to an associated deaggregating node typically co-located with the base station controller. A non-aggregated cell is a cell for which traffic from the base station associated with that cell is transported directly to the base station controller without passing through an aggregating node.

The categorization of cells as aggregated or non-aggregated is performed according to tariff structures. A tariff structure is defined such that links of length less than X are charged cost A and links of length greater than X are charged cost B, where cost B is greater than cost A. In one embodiment of the invention, the radius of each cluster is equal to the length X. The use of aggregating nodes in accordance with the cell categorizations ensures that a portion of existing low-speed links charged according to a larger tariff cost are replaced with a combination of low-speed links between the base stations and the aggregating node and high-speed links between the aggregating node and the deaggregating node.

The categorization of cells enables determination of aggregating node configurations since cells are grouped into regions based on traffic demand and subscriber density, and once the number of aggregated cells associated with each cluster is determined, the amount of traffic that must be supported by the aggregating nodes is determined. Using the amount of traffic that must be supported by the aggregating nodes, the associated aggregating node configurations are determined, where an aggregating node configuration may include the number of each type of line card required for supporting that amount of traffic. Similarly, the deaggregating node configuration is determined using the aggregating node configurations of the aggregating nodes associated with that deaggregating node, which are representative of the amount of traffic that must be supported by the deaggregating node.

A capital expenditure associated with purchasing equipment for an optimized backhaul network is determined using the aggregating node configurations and deaggregating node configurations. A node configuration includes a number of each type of line card or link required by that node for supporting a particular amount of traffic. A pricing model defines prices for respective line card types. A capital expenditure is determined by applying a pricing model to the aggregating node configurations and deaggregating node configurations in order to determine capital expenditures associated with each of the aggregating nodes and deaggregating nodes.

An operational expenditure associated with maintaining or leasing links for an optimized backhaul network is determined using the aggregating node configurations and deaggregating node configurations. An operational expenditure includes an equipment-based operational expenditure portion, i.e., an operational cost for maintaining equipment, and a link-based operational expenditure portion, i.e., an operational cost for maintaining/leasing links. An equipment-based operational expenditure is determined using the number of each type of line card associated with each node configuration. The equipment-based operational expenditure is determined by applying a maintenance pricing model to the node configurations. The link-based operational expenditure is determined using the number of each type of link. The number of each type of link is determined using the number of each type of line card associated with the node configurations. The link-based operational expenditure is determined using a tariff structure that defines tariff prices based on link type and link length.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a wireless backhaul network comprising a plurality of base stations and a backhaul termination location; however, the methodologies of the present invention can readily be applied to other networks and network topologies. In general, the present invention produces an accurate estimate such as for a preliminary design, of service provider savings resulting from backhaul network optimization performed using limited network information. As such, the present invention obviates the need for collection, preprocessing, and analysis of detailed base station location and base station traffic information.

Furthermore, the present invention enables determination of capital expenditure savings, operational expenditure savings, and the like savings resulting from aggregation of backhaul links at intermediate points between the base stations and the network controllers located at backhaul termination locations, and transporting the backhaul traffic over higher rate links between the intermediate points and the network controllers. As such, using limited input information from the wireless service provider, the present invention produces an accurate estimate of wireless service provider savings achieved using various backhaul network optimization configurations.

Figure 1:
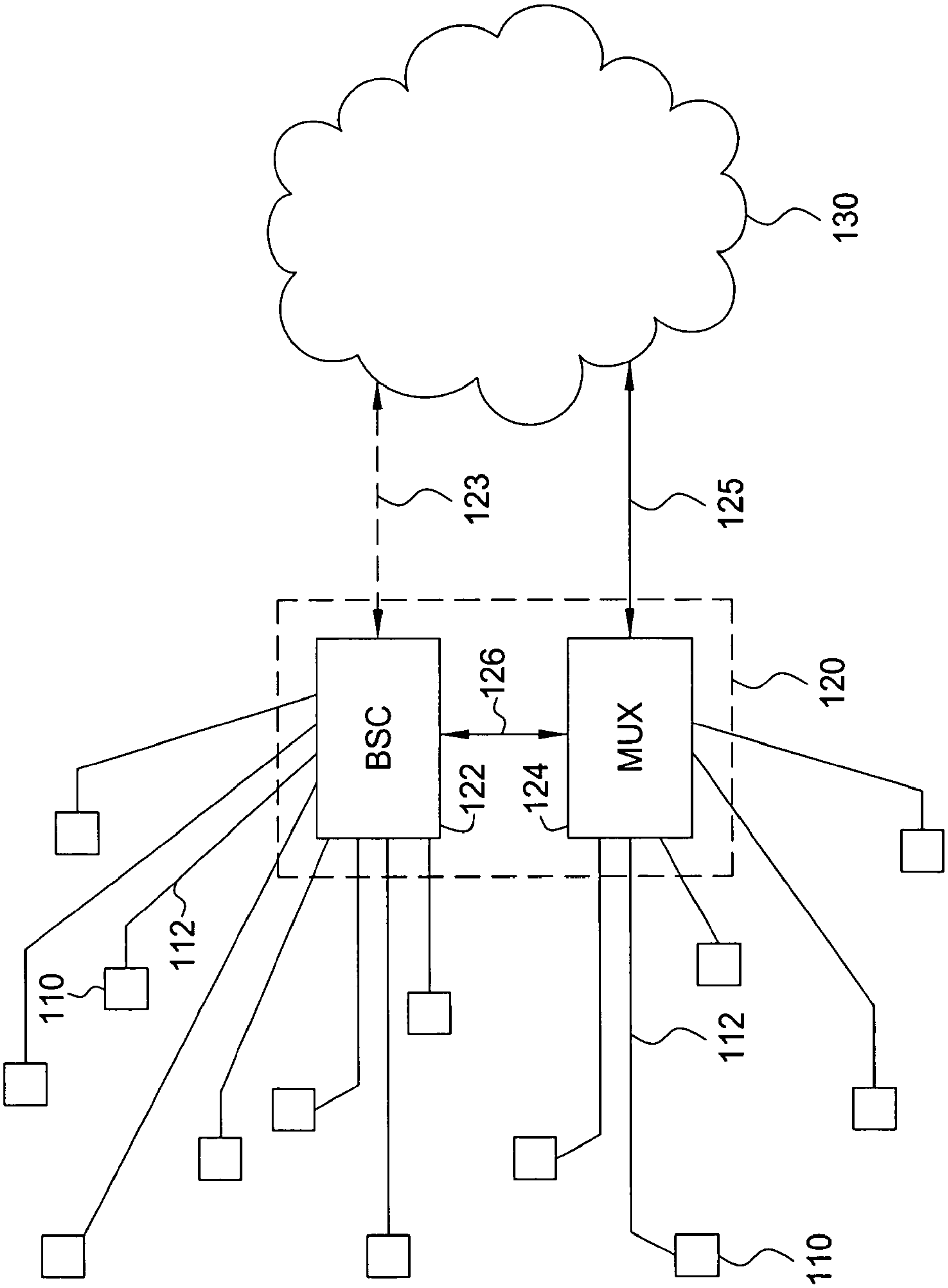
FIG. 1 depicts a high-level block diagram of a wireless communications network.

FIG. 1 depicts a high-level block diagram of a wireless communications network. Specifically, wireless communications network 100 of FIG. 1 comprises a plurality of base stations (BSs) 110 (collectively, BSs 110), a backhaul termination location (BTL) 120, and a network 130. As depicted in FIG. 1, BSs 110 communicate with network elements in BTL 120 using a respective plurality backhaul communication links (BCLs) 112 (collectively, BCLs 112). As depicted in FIG. 1, BTL 120 comprises a base station controller (BSC) 122 and a multiplexer (MUX) 124. The MUX 124 communicates with network 130 using a communication link (CL) 125. In one embodiment, BSC 122 optionally communicates with network 130 using a communication link (CL) 123. The BSC 122 communicates with MUX 124 using a communication link (CL) 126.

In one embodiment, BSs 110 in communication with BSC 122 using associated BCLs 112 comprise Global System for Mobile (GSM)/General Packet Radio Service (GPRS) base transceiver stations (BTSs). In this embodiment, in which a BS 110 comprises a GSM/GPRS BTS, the BS 110 is controlled by a BSC (illustratively, BSC 122). In another embodiment, BSs 110 in communication with MUX 124 using associated BCLs 112 comprise Universal Mobile Telecommunications System (UMTS) NODE-Bs. In this embodiment, in which a BS 110 comprises a UMTS NODE-B, the BS 110 is controlled by a radio network controller (RNC) (not depicted). In general, BTSs, NODE-Bs, and like base stations comprise radio transceivers that define a wireless cell, and coordinate radio-link protocols with wireless devices (not depicted).

As depicted in FIG. 1, BCLs 112 comprise communication links operable for transporting wireless traffic between BSs 110 and BTL 120. Although depicted as comprising a direct connection between BSs 110 and BTL 120, in one embodiment, communications between the BSs 110 and BTL 120 is facilitated using various other networks, network elements, communication links, and the like. In other words, backhauling of traffic between BSs 110 and BTL 120 is performed using at least one of a plurality of technologies, network configurations, and the like.

In one embodiment, backhauling of traffic between BSs 110 and BTL 120 is performed using time division multiplexing (TDM) transport such as plesiochronous digital hierarchy (PDH) networks, synchronous optical networks (SONET) networks, synchronous digital hierarchy (SDH) networks, and like TDM-based networks. For example, BSs 110 may communicate with TDM multiplexers using TDM links such as T1 links, E1 links, and the like, and the like. The TDM multiplexers communicate with a SONET/SDH transport network comprising ADMs that communicate with BTL 120, i.e., BSC 122, MUX 124, and the like, using various combinations of links such as T3/E3 links, synchronous transfer mode level one (STM-1) links, and the like.

In another embodiment, backhauling of traffic between BSs 110 and BTL 120 is performed using asynchronous transfer mode (ATM) transport. For example, BSs 110 may communicate with ATM switches, ATM multiplexers, and the like using various TDM-based links such as T1 links, E1 links, and the like, ATM IMA links, and the like. The ATM multiplexers communicate with an ATM transport network comprising ATM switches that communicate with BTL 120, i.e., BSC 122, MUX 124, and the like using various combinations of links such as T3/E3 links, T1/E1 links, and the like.

In another embodiment, backhauling of traffic between BSs 110 and BTL 120 is performed using digital subscriber line (DSL) transport. For example, BSs 110 may communicate with integrated access devices (IADs). The IADs communicate with digital subscriber line access multiplexers (DSLAMs) for accessing a transport network such as an ATM transport network. The transport network comprises network elements such as ATM switches, that communicate with BTL 120, i.e., BSC 122, MUX 124, and the like, using various combinations of links such as T3/E3 ATM links, T1/E1 ATM links, and the like.

In another embodiment, backhauling of traffic between BSs 110 and BTL 120 is performed using a packet-switched transport network. For example, BSs 110 may communicate with BTL 120 using at least one of an Internet Protocol (IP) network, a Multi-Protocol Label Switching (MPLS) network, an Ethernet network, and like packet-switched networks as know in the art. In another embodiment, backhauling of traffic between BSs 110 and BTL 120 is performed using a radio-based solution such as point-to-point (PTP) microwave links, point-to-multipoint (PTMP) local multipoint distribution services (LMDS), and the like. Furthermore, backhauling of traffic between BSs 110 and BTL 120 may be performed using various other combinations of technologies, network configurations, and the like. For example, in one embodiment, backhauling of traffic is performed using at least one microwave link.

The network 130 comprises a transport network operable for receiving wireless traffic from BTL 120 and transmitting wireless traffic to BTL 120. As such, network 130 may comprise of at least one of a circuit-switched network, a packet-switched network, and the like. For example, network 130 may comprise at least one of an ATM network, and MPLS network, an IP network, an Ethernet network, a SONET network, an SDH network, and the like. As such, network 130 may comprise various associated network elements such as switches, routers, ADMs, and like network elements. The network 130 may comprise gateway GPRS support nodes (GGSNs), serving GPRS support nodes (SGSNs), mobile switching centers (MSCs), and like network elements for supporting transport of wireless traffic. Furthermore, network 130 may comprise various service elements, associated service logic, databases, and the like.

Although depicted and described herein with respect to GSM/GPRS and UMTS wireless communications standards, the present invention may be used for backhaul network optimization in wireless networks utilizing other wireless communications protocols. For example, wireless communications network 100 of FIG. 1 may comprise other first-generation (1G) and second-generation (2G) wireless networks (e.g., AMPS, TDMA, GSM, and the like), an enhanced data rates for GPRS evolution (EDGE) network, other third-generation (3G) wireless networks (e.g., a Wideband Code Division Multiple Access (WCDMA) network, a CDMA2000 Evolution Data Optimized (EvDO) network, a UMTS High-Speed Downlink Packet Access (HSDPA) network, and the like), a Fourth Generation (4G) wireless network, a wireless fidelity (WIFI) network, and like wireless communications networks and protocols as known in the art.

Although depicted as comprising specific numbers of BSs 110, BCLs 112, BTLs 120, BSCs122, CLs 123, MUXs 124, CLs 125, CLs 126, and networks 130, those skilled in the art will appreciate that fewer or more BSs 110, BCLs 112, BTLs 120, BSCs 122, CLs 123, MUXs 124, CLs 125, CLs 126, and networks 130 may be used. Similarly, BSs 110, BCLs 112, BTLs 120, BSCs 122, CLs 123, MUXs 124, CLs 125, CLs 126, and networks 130 may be deployed in various different configurations. Furthermore, other networks, base stations, network elements, communication links, and the like may be utilized in support of the present invention.

In general, wireless transport comprises wireless access transport and wireless backhaul transport. As such, wireless backhaul transport comprises transport of BTS traffic flows such as for GSM/GPRS, NODE-B traffic flows such as for UMTS, and like traffic flows to a service provider core network. As described herein, various technologies, equipment, physical interfaces, communication links, and the like may be utilized for wireless backhaul. As depicted in FIG. 1, wireless backhaul is represented by the BCLs 112. In general, wireless backhaul represents a substantial portion of the wireless transport costs and, therefore, substantially impacts wireless service provider capital expenditures (CAPEX), operational expenditures (OPEX), and the like service provider expenditures. As such, as wireless networks evolve (e.g., as UMTS networks move wireless traffic from TDM transport technologies towards packet transport technologies), optimization of backhaul networks to reduce CAPEX, OPEX, and like expenditures is desirable. In one embodiment, the present invention is operable for estimating wireless service provider expenditures (and associated expenditure savings) associated with various wireless backhaul solutions.

Figure 2:
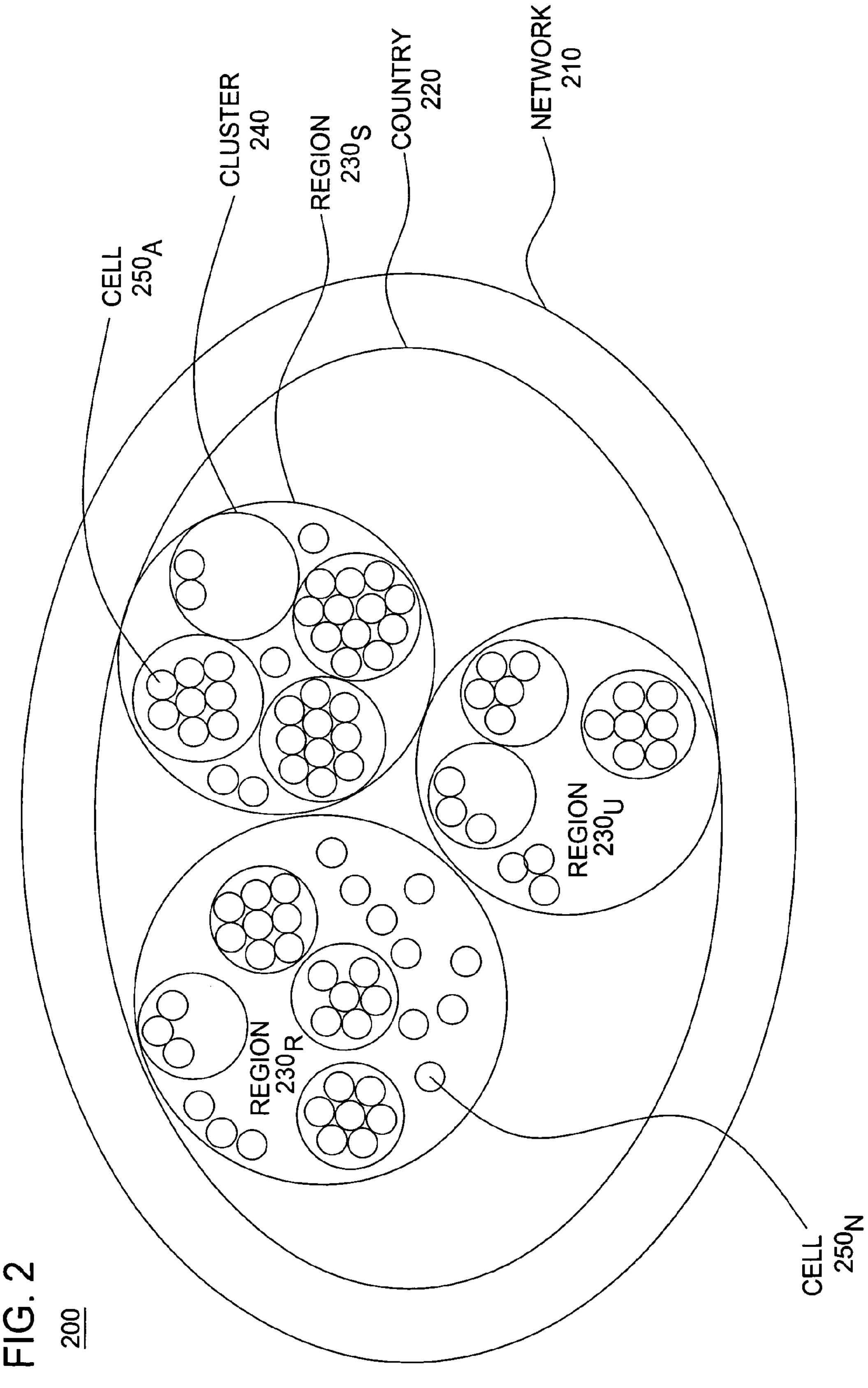
FIG. 2 depicts hierarchical geographical representation of a wireless communications network.

FIG. 2 depicts a hierarchical geographical representation of a wireless communications network. Specifically, hierarchical geographical representation 200 of FIG. 2 comprises a network 210. The network 210 comprises a country 220. The country 220 comprises a plurality of regions $\mathbf{230}_U$, $\mathbf{230}_S$, and $\mathbf{230}_R$ (collectively, regions 230), where region $\mathbf{230}_U$ represents an urban region, region $\mathbf{230}_S$ represents a suburban region, and region $\mathbf{230}_R$ represents a rural region. The regions 230 comprise respective pluralities of clusters 240 (collectively, clusters 240). The clusters 240 comprise respective pluralities of cells 250 (collectively, cells 250). In one embodiment, the regions 230 comprise a plurality of non-aggregated cells $\mathbf{250}_N$ (collectively, cells $\mathbf{250}_N$). In one embodiment, the clusters 240 comprise respective pluralities of aggregated cells $\mathbf{250}_A$ (collectively, cells $\mathbf{250}_A$). The non-aggregated cells $\mathbf{250}_N$ and aggregated cells $\mathbf{250}_A$ are denoted as cells 250.

In one embodiment, a network (illustratively, network 210) comprises a geographical representation of at least one portion of a service provider network such as at least one portion of a wireless network. In one embodiment, a country (illustratively, country 220) comprises a geographical representation of at least one country such as Italy. In one embodiment, a region (illustratively, one of regions 230) comprises a geographical representation of at least a portion of at least one country such as a portion of Italy. As such, wireless communications network 100 depicted and described herein with respect to FIG. 1 may be modeled as one of network 210, country 220, and one of the regions 230.

In one embodiment, a country comprises at least one region, where each of the at least one region is representative of a region type such as urban, suburban, rural, and the like. For example, although a country may comprise geographically dispersed urban regions, in one embodiment, all of the geographically dispersed urban areas are modeled as an urban region (illustratively, region $\mathbf{230}_U$). Similarly, geographically dispersed suburban areas are modeled as a suburban region (illustratively, region $\mathbf{230}_S$) and geographically dispersed rural areas are modeled as a rural region (illustratively, region $\mathbf{230}_R$). Although depicted and described herein as modeling a region type using one region, in one embodiment, a region type is modeled using a plurality of regions such as a first urban region and a second urban region. Furthermore, although depicted and described herein with respect to three region types, in one embodiment, at least one other region type such as dense urban, is utilized for modeling a region.

In one embodiment, at least one of a network, a country, and a region is partitioned according to at least one base station configuration type. In one such embodiment, a base station configuration type is defined according to at least one of a population density, a subscriber density, subscriber traffic demands, and the like. As such, in one embodiment, backhaul requirements vary across regions. For example, in one embodiment, a base station configuration type associated with an urban region (in which adequate capacity is a primary design consideration) is different than a base station configuration type associated with a rural region (in which adequate wireless coverage area is a primary design consideration).

In one embodiment, a cluster (illustratively, one of clusters 240) comprises a region, i.e., the region is modeled as a single cluster. In another embodiment, a cluster comprises a portion of a region. In general, a cluster comprises at least one aggregated cell, i.e., cell $\mathbf{250}_A$. As such, in one embodiment, a cluster comprises at least one associated aggregating node. In one embodiment, a cluster is modeled as a circular area comprising an associated cluster radius. In one further embodiment, a cluster radius is determined according to at least one tariff structure. In one such embodiment, a tariff structure is a function of at least one of a distance such as a distance between a base station and an aggregating node, a data rate, i.e., a rate associated with a backhaul link, and the like.

In one embodiment, for example, assuming links of length less than X comprise an associated tariff of cost A and links of length greater than X comprise an associated tariff of cost B (where cost A is less than cost B), the cluster radius comprises a value substantially equal to X. As such, the cluster radius is selected in a manner enabling maximization of expenditure savings. In other words, selection of a cluster radius according to a tariff structure enables traffic associated with a maximum number of BSs to be aggregated at an aggregating node using associated links charged according to the lower tariff, i.e., charged according to tariff of cost A associated with links of length less than X. As such, in one embodiment, a cluster radius comprises as a maximum distance that a base station may be from an aggregating node.

In one embodiment, a cell (illustratively, one of cells 250) comprises a geographical portion of a region. In one further embodiment, a cell (illustratively, one of cells $\mathbf{250}_A$) comprises a geographical portion of a cluster. In one embodiment, a cell comprises at least one base station. In one embodiment, a cell is modeled as a circular area. In one further embodiment, a base station is located at the center of the associated cell. In one embodiment, a cell area associated with a cell is representative of a traffic demand associated with the cell. A cell comprising a base station not in communication with an aggregating node, i.e., a base station in communication with a BTL, comprises a non-aggregated cell, i.e., cells $\mathbf{250}_N$. A cell comprising a base station in communication with an aggregating node comprises an aggregated cell, i.e., cells $\mathbf{250}_A$.

As depicted in FIG. 2, network 210 comprises country 220, the country 220 comprises regions 230, the regions 230 comprise clusters 240, and the clusters 240 comprise cells 250. As such, as depicted and described herein with respect to FIG. 2, the hierarchical geographical representation 200 comprises (from largest geographic area to smallest geographic area) network, country, region, cluster, and cell. Furthermore, although depicted as comprising specific numbers of networks 210, countries 220, regions 230, clusters 240, and cells 250, in one embodiment, hierarchical geographical representation 200 may comprise any combination of networks 210, countries 220, regions 230, clusters 240, and cells 250.

Figure 3:
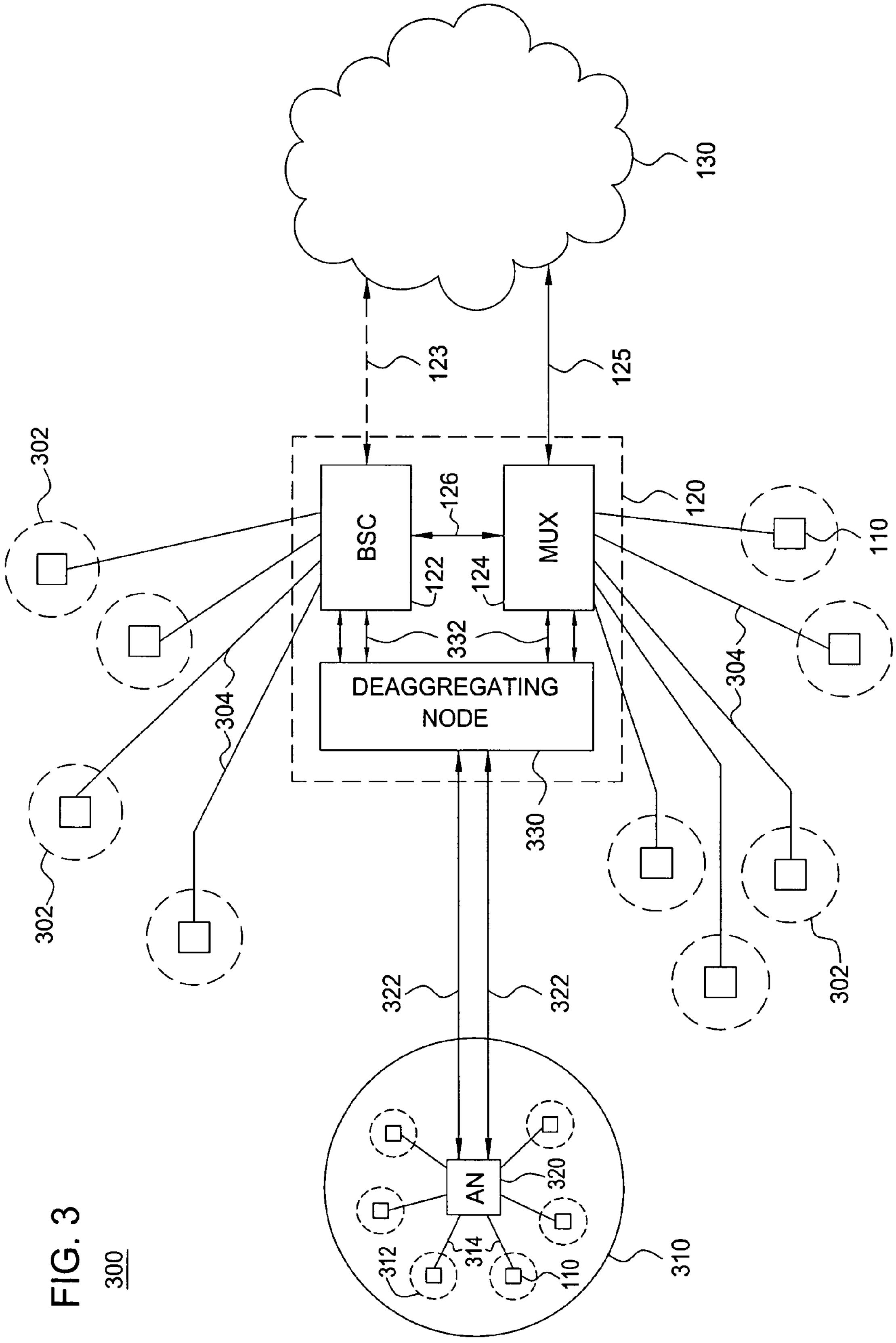
FIG. 3 depicts a high-level block diagram of the wireless communications network of FIG. 1 further including an aggregating node and deaggregating node for backhaul optimization.

FIG. 3 depicts a high-level block diagram of the wireless communications network of FIG. 1 further comprising an aggregating node and a deaggregating node for backhaul optimization. Specifically, wireless communications network 300 of FIG. 3 comprises a cluster 310, an aggregating node (AN) 320, and a deaggregating (DN) 330. As depicted in FIG. 3, AN 320 is located within cluster 310. Although not depicted, in one embodiment, AN 320 is located substantially near the center of cluster 310, thereby enabling a maximum number of BSs 110 to communicate with AN 320 using links comprising a minimum associated operational cost. As depicted in FIG. 3, DN 330 is located within BTL 120.

As depicted in FIG. 3, the plurality of BSs 110 not located within cluster 310 comprise BSs 110 located within a respective plurality of non-aggregated cells (NCs) 302 (collectively, NCs 302). As depicted in FIG. 3, BSs 110 located within the NCs 302 communicate with network elements located within BTL 120 using a respective plurality of non-aggregated links (NLs) 304 (collectively, NLs 304). In one embodiment, in which BSs 110 comprise GSM/GPRS BTSs, BSs 110 located within NCs 302 communicate with BSC 122 using NLs 304. In another embodiment, in which BSs 110 comprise UMTS NODE-Bs, BSs 110 located within NCs 302 communicate with MUX 124 using NLs 304.

The NLs 304 comprise communication links operable for enabling BSs 110 located within NCs 302 to communicate directly with BTL 120. In one embodiment, for example, NLs 304 comprise T1/E1 TDM links, T1/E1 ATM links, and like links as known in the art. In other words, NLs 304 comprise communication links substantially similar to BCLs 112 depicted and described in respect to FIG. 1. In one embodiment, in which the tariff structure used for computing the operational expenditure associated with NLs 304 comprises a step function, the NLs 304 comprise links of length greater than X and, as such, comprise larger associated link tariffs. In other words, the service provider does not obtain the benefit of shorter link lengths and, therefore, smaller link tariff achieved for aggregated cells located within cluster 310.

As depicted in FIG. 3, the plurality of BSs 110 located within cluster 310 are located within a respective plurality of aggregated cells (AC) 312 (collectively, ACs 312). The BSs 110 located within ACs 312 communicate with AN 320 using a respective plurality of aggregating access links (AALs) 314 (collectively AALs 314). In one embodiment, BSs 110 communicate with AN 320 using the AALs 314 irrespective of base station type. In general, AALs 314 comprise communication links operable for transporting wireless traffic between BSs 110 and AN 320. For example, the AALs 314 comprise various combinations of T1/E1 TDM links, T1/E1 ATM links, and like communication links as known in the art. In one embodiment, in which a tariff structure used for computing the operational expenditure associated with AALs 314 comprises a step function, AALs 314 comprise links of length less than X (where the cluster radius of cluster 310 is approximately equal to X) and, as such, comprise smaller associated link tariffs. In other words, the service provider obtains the benefit of shorter link lengths (and, therefore, smaller link tariffs) achieved for cells located within cluster 310).

As depicted in FIG. 3, AN 320 comprises a network element operable for receiving traffic from BSs 110 located within ACs 310. The AN 320 aggregates such as multiplexes, the traffic received from the BSs 110 located within the ACs 310 for transmission towards DN 330 using a plurality of aggregating backhaul links (ABLs) 322 (collectively, ABLs 322). Similarly, AN 320 comprises a network operable for receiving aggregated traffic from DN 330 via the ABLs 322. Although not depicted, in one embodiment, AN 320 may be co-located with at least a portion of the BSs 110 located within cluster 310 (similar to co-location of GSM/GPRS and UMTS base stations described herein with respect to FIG. 1).

As depicted in FIG. 3, DN 330 comprises a network element operable for receiving aggregated traffic from AN 320 using the ABLs 322. The DN 330 deaggregates such as demultiplexes, the traffic received from AN 320 for transmission towards network 130. The DN 330 transmits GSM/GPRS-based traffic towards network 130 using BSC 122. The DN 330 transmits UMTS-based traffic towards network 130 using MUX 124. The DN 330 transmits traffic towards network 130 using a plurality of deaggregating links (DLs) 332 (collectively, DLs 332). In other words, in one embodiment, DN 330 communicates with BSC 122 using DLs 332 for transporting 2G-wireless traffic and communicates with MUX 124 using DLs 332 for transporting 3G-wireless traffic.

As described herein, AN 320 and DN 330 comprise network elements operable for aggregating and deaggregating traffic. As such, in one embodiment, AN 320 and DN 320 comprise ATM switches, TDM switches, IP routers, and like network elements capable of aggregating and deaggregating traffic. Furthermore, ABLs 322 comprise T3/E3 ATM links, STM4/STM1 links, and like links as known in the art. As such, since ABLs 322 transport traffic aggregated from a plurality of AALs 314, data rates associated with ABLs 322 are generally larger than data rates associated with AALs 314. For example, in one embodiment, AN 320 and DN 330 comprise ATM switches in communication using associated T3/E3 ATM links (illustratively, ABLs 322).

By aggregating the BCLs 112 at aggregating locations close to the BSs 110, wireless service providers thereby avoid paying low-speed link tariffs associated with links from at least a portion of the BSs 110 to BTL 120. As such, the wireless service provider realizes significant CAPEX savings (by using a smaller number of high speed interfaces), OPEX savings, and like savings by utilizing a smaller number of high-speed communication links (as opposed to a larger number of low-speed communication links) for transporting wireless traffic over the longer distance from the aggregation site, i.e., AN 320, to the deaggregation site, i.e., DN 330. As such, for a tariff structure modeled as a step function, use of AN 320 and DN 330 enables the service provider to convert at least a portion of the links previously leased at a higher cost in the tariff structure, i.e., BCLs 112 depicted and described with respect to FIG. 1, to a combination of links leased at a lower cost in the tariff structure, i.e., AALs 314, and associated high-speed aggregating backhaul links, i.e., ABLs 322, and deaggregating links, i.e., DLs 332.

In other words, a portion of the BCLs 112 between BSs 110 and BTL 120 have been replaced by a combination of AALs 314 (between the BSs 110 and AN 320), ABLs 322 (between AN 320 and DN 330), and DLs 332 (between DN 330 and one of BSC 122 and MUX 124). As such, the cells associated with the BSs 110 directly connected to BTL 120 via NLs 304 comprise NCs 302, and the cells associated with the BSs 110 in communication with BTL 120 via AN 120 and DN 130 comprise the ACs 310. In one embodiment, the number of NCs 302 and number of ACs 310 is determined according to at least one aggregation fraction. In other words, an aggregation fraction is indicative of a percentage of BSs 110 in communication with network 130 using an associated AN 320.

Although described herein with respect to one region comprising one cluster, in one embodiment, at least a portion of the methodologies of the present invention may be used for each of a plurality of networks associated with a service provider, each of a plurality of countries associated with a network, each of a plurality of regions associated with a country, each of a plurality of clusters associated with a region, and the like. As such, various financial parameters such as CAPEX, CAPEX savings, OPEX, OPEX savings, and like financial parameters may be computed for at least one of a cluster, a plurality of clusters, a region, a plurality of regions, a country, a plurality of countries, a network, a plurality of networks, and the like. Furthermore, financial parameters such as net present value (NPV), cumulative discounted cash flow (CDCF), sensitivity analysis (SA), and like financial parameters may be computed for at least one of a year, a plurality of years, and the like.

Figure 4:
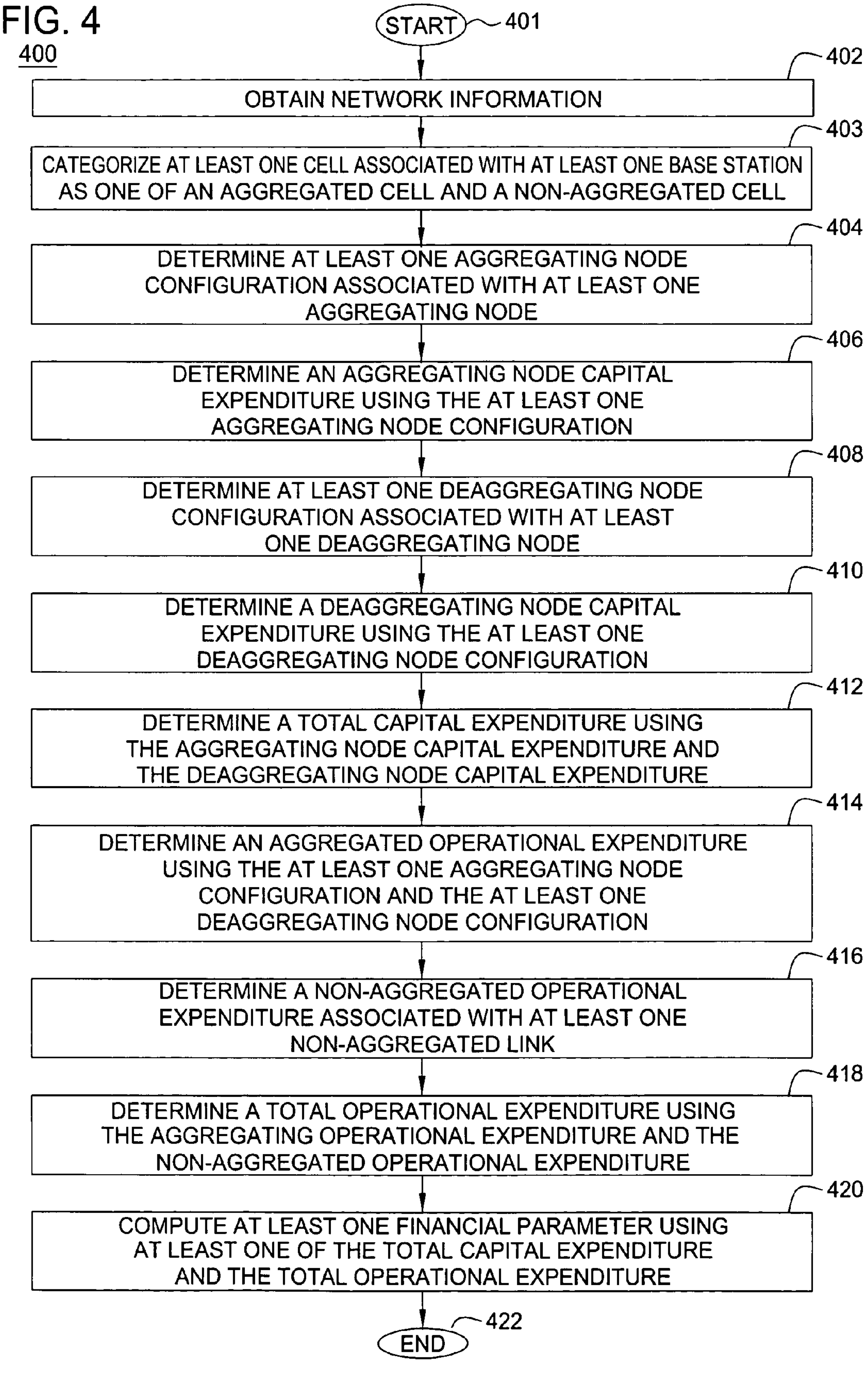
FIG. 4 depicts a flow diagram of a method according to one embodiment of the invention.

FIG. 4. depicts a flow diagram of a method according to one embodiment of the invention. Specifically, method 400 of FIG. 4 comprises a method for determining at least one financial parameter. Although a portion of the steps are depicted as being performed serially, those skilled in the art will appreciate that at least a portion of the steps of method 400 may be performed contemporaneously, as well as in a different order than presented in FIG. 4. The method 400 is entered at step 401 and proceeds to step 402.

At step 402, network information is obtained. In one embodiment, network information is associated with at least one portion of a network such as an optimized backhaul network. In one embodiment, network information is adapted for categorizing at least one cell associated with at least one base station of at least one portion of a network as one of an aggregated cell and a non-aggregated cell. In one embodiment, network information is used for determining at least one node configuration such as line cards requiring for supporting network traffic. In another embodiment, network information is used for determining a number of links required for supporting network traffic. Thus, the network information is adapted for determining a capital expenditure, an operational expenditure, and like expenditures.

In one embodiment, at least a portion of the network information is obtained from at least one remote system such as a network inventory management system, a network provisioning system, and like systems, in communication with a system on which at least a portion of the methodologies of the present invention are performed. In one such embodiment, at least a portion of the network information is obtained from at least one of a database, a memory, and like storage components as known in the art. In one further embodiment, at least a portion of the network information is discovered directly from the network such as querying various base stations and associated network elements to obtain network information.

At step 403, at least one cell associated with at least one base station is categorized as one of an aggregated cell and a non-aggregated cell. At step 404, at least one aggregating node configuration associated with at least one aggregating node is determined. In one embodiment, determining at least one aggregating node configuration comprises determining a link type associated with each of at least one aggregating access link and determining a link type associated with each of at least one aggregating backhaul link. At step 406, an aggregating node capital expenditure is determined. In one embodiment, an aggregating node capital expenditure is computed using the at least one aggregating node configuration. As such, in one embodiment, the aggregating node capital expenditure is computed using a card type (or link type) associated with each of at least one aggregating access link, a card type (or link type) link type associated with each of at least one aggregating backhaul link, and at least one pricing model.

At step 408, at least one deaggregating node configuration associated with at least one deaggregating node is determined. In one embodiment, determining a deaggregating node configuration comprises determining a card type (or link type) associated with each of at least one aggregating backhaul link and determining a card type (or link type) associated with each of at least one deaggregating link. At step 410, a deaggregating node capital expenditure is determined. In one embodiment, the deaggregating node capital expenditure is computed using the at least one deaggregating node configuration. As such, in one embodiment, the deaggregating node capital expenditure is computed using the card type associated with each of at least one aggregating backhaul link, the card type associated with each of the at least one deaggregating link, and at least one pricing model.

At step 412, a total capital expenditure is determined. In one embodiment, the total capital expenditure is computed using the aggregating node capital expenditure and the deaggregating node capital expenditure. In one embodiment, the total capital expenditure comprises a capital expenditure associated with at least one of a cluster, a region, a plurality of regions, a country, a plurality of countries, a network, a plurality of networks, and the like. In general, a capital expenditure associated with a network element comprises a cost associated with the network element hardware such as a cost for all line cards, in all shelves, in all chassis of each aggregating node, deaggregating node, and like equipment associated with a backhaul network.

At step 414, an aggregated operational expenditure is determined. In one embodiment, the aggregated operational expenditure is computed using the at least one aggregating node configuration and the at least one deaggregating node configuration. In one embodiment, an aggregated operational expenditure comprises an equipment-based operational expenditure and a link-based operational expenditure. In one embodiment, the equipment-based portion of the aggregated operational expenditure comprises a cost incurred by a wireless service provider such as for staffing, equipment repairs, equipment upgrades, and the like, for operating the deployed backhaul equipment such as aggregating nodes, deaggregating nodes, and the like.

The determination of link-based operational expenditure varies according to the link owner such as whether the links are owned by a wireless service provider or a third-party provider. In one embodiment, in which the wireless service provider owns the links, the link-based portion of the aggregated operational expenditure comprises the costs incurred by the wireless service provider in maintaining the links. In one such embodiment, the aggregated operational expenditure is computed using at least one maintenance pricing model. In another embodiment, in which a third party provider owns the aggregating access links and the deaggregating access links, the aggregated operational expenditure is computed using at least one aggregating access link tariff associated with each of the at least one aggregating access link and at least one aggregating backhaul link tariff associated with each of the at least one aggregating backhaul link.

At step 416, a non-aggregated operational expenditure is determined. In one embodiment, the non-aggregated operational expenditure is computed for each non-aggregated link, i.e., non-aggregated links associated with base stations located within non-aggregated cells. In one embodiment, a non-aggregated operational expenditure comprises an equipment-based operational expenditure and a link-based operational expenditure. In one embodiment, the equipment-based portion of the non-aggregated operational expenditure comprises a cost incurred by a wireless service provider such as for staffing, equipment repairs, equipment upgrades, and the like, for operating the deployed backhaul equipment such as base stations, base station controllers, multiplexers, and the like.

In one embodiment, in which the wireless service provider owns the links, the link-based portion of the aggregated operational expenditure comprises the costs incurred by the wireless service provider in maintaining the links. In one such embodiment, the aggregated operational expenditure is computed using at least one maintenance pricing model. In another embodiment, in which a third party provider owns the aggregating access links and the deaggregating access links, the aggregated operational expenditure is computed using at least one non-aggregated link tariff associated with each of the at least one non-aggregated link.

At step 418, a total operational expenditure is determined. In one embodiment, the total operational expenditure is computed using the aggregated operational expenditure and the non-aggregated operational expenditure. In one embodiment, an operational expenditure comprises an equipment-based operational expenditure and a link-based operational expenditure. In one embodiment, computation of a link-based operational expenditure varies with the owner of the links such as whether the links are owned by the wireless service provider or a third party provider.

At step 420, at least one financial parameter is computed. In one embodiment, the at least one financial parameter is computed using at least one of the optimized capital expenditure and the optimized operational expenditure. In one embodiment, a financial parameter comprises at least one of a CAPEX savings and an OPEX savings. In one embodiment, the CAPEX savings comprises a difference between an original CAPEX such as a CAPEX associated with the configuration of FIG. 1, and the optimized CAPEX such as a CAPEX associated with the configuration of FIG. 3. In one embodiment, the OPEX savings comprises a difference between an original OPEX such as an OPEX associated with the configuration of FIG. 1, and the optimized OPEX such as an OPEX associated with the configuration of FIG. 3. In one further embodiment, a financial parameter comprises at least one of a net present value (NPV), a cumulative discounted cash flow (CDCF), a sensitivity analysis (SA), and the like financial parameters. The method 400 then proceeds to step 422 where the method 400 ends.

In one embodiment, a node configuration such as aggregating node configuration, deaggregating node configuration, and the like, comprises a number of chassis associated with the node, a number of shelves associated with each chassis, a number of cards associated with each shelf, a number of ports associated with each card, and a port type such as T3 TDM, T3 ATM, and the like, associated with each port. In one embodiment, a card comprises a card type such as T3 ATM card, determined based on the number of ports associated with each card and the associated port types. In one embodiment, a pricing model comprises a cost associated with each port type, a cost associated with each card type, and the like.

In one embodiment, a link type is defined according to at least one of a plurality of link parameters. For example, a link type may be defined according to a technology type parameter such as ATM, TDM, and the like, a data rate parameter such as T3, T1, and the like, and like parameters. For example, in one embodiment, T3 TDM, T3 ATM, and the like comprise link types. In other words, in one embodiment, link type and port type are identical. As such, determination of link types associated with a node may be used for determining the associated node configuration. Similarly, a node configuration associated with a node may be used for determining associated link types.

Since port types and link types are often related, in one embodiment, a pricing model comprises at least one of a cost associated with a link type, a cost association with a port type, and the like. For example, a T1 port may cost $1000. As such, according to this pricing model, a T1 card comprising 8 ports has an associated cost of $8000. Similarly, a shelf comprising 12 such T1 cards has an associated cost of $96,000. Furthermore, similar computations may be performed with respect to costs associated with the chassis, other nodes in the network, and the like. As such, by using the numbers and types of links associated with a node to determine the number and types of ports required by that node, a total capital expenditure associated with a node, a portion of a network, a network, and the like may be computed.

Figure 5A:
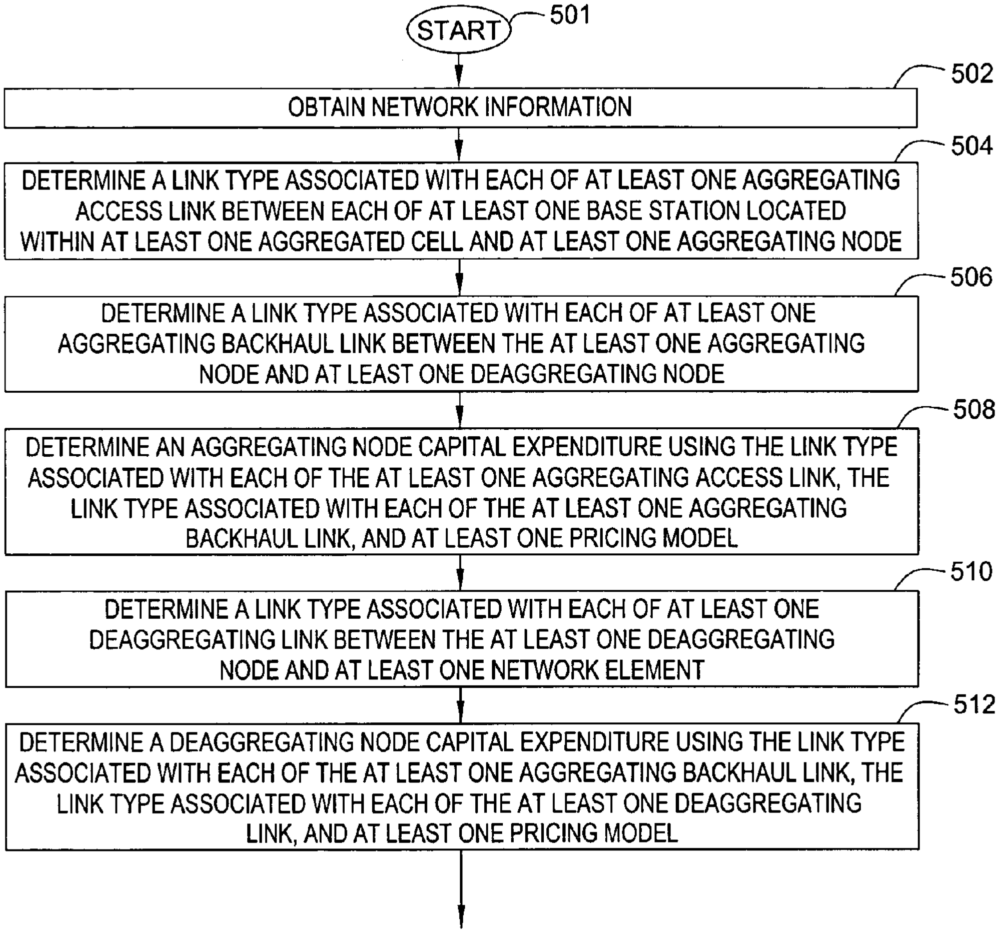
FIG. 5 depicts a flow diagram of a method according to one embodiment of the invention.
Figure 5A:
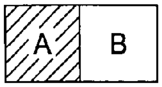
Figure 5B:
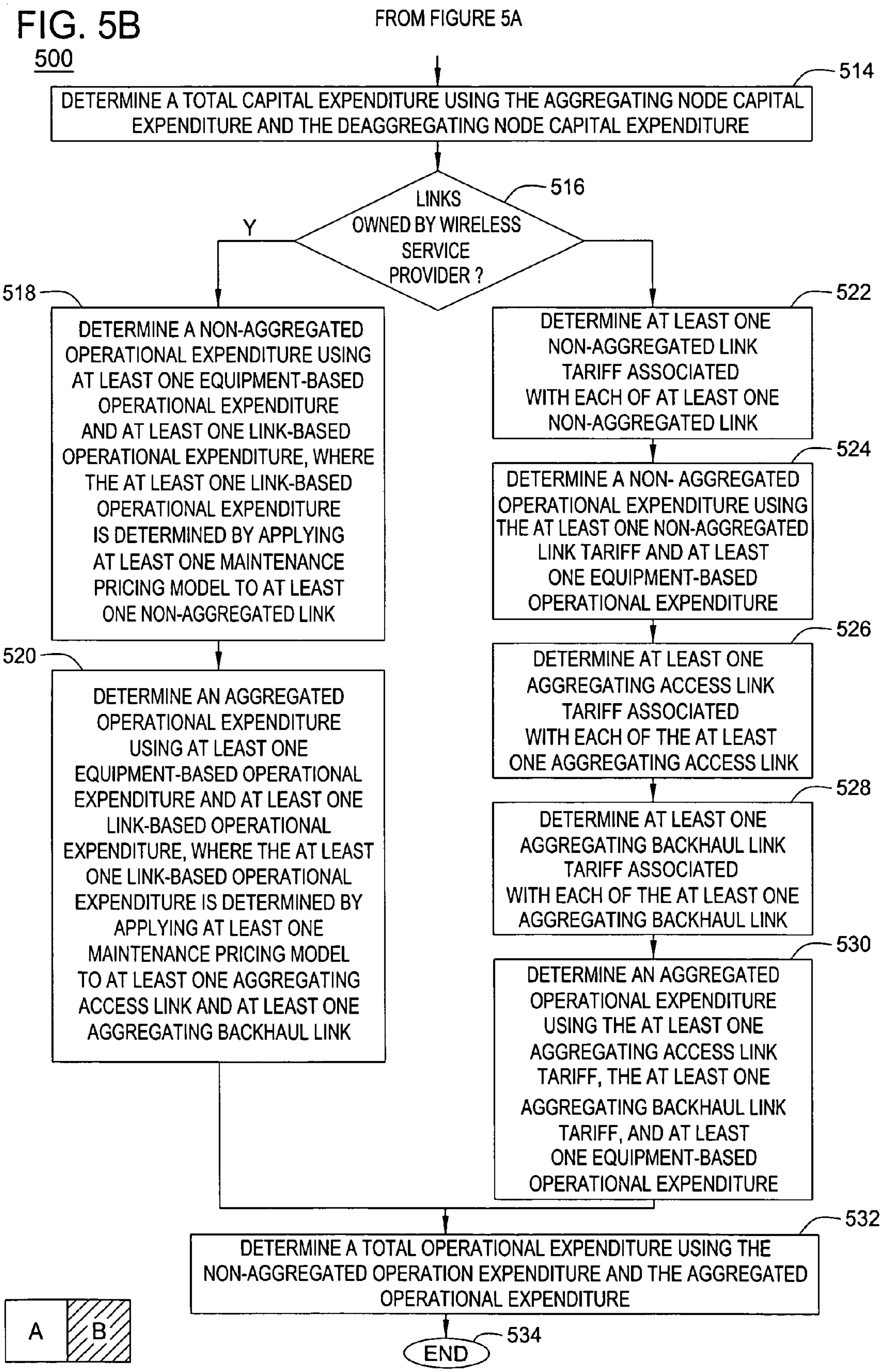

FIG. 5 depicts a flow diagram of a method according to one embodiment of the invention. Specifically, method 500 of FIG. 5 comprises a method for computing at least one expenditure. Although a portion of the steps are depicted as being performed serially, those skilled in the art will appreciate that at least a portion of the steps of method 500 may be performed contemporaneously, as well as in a different order than presented in FIG. 5. The method 500 is entered at step 501 and proceeds to step 502.

At step 502, network information is obtained. In one embodiment, network information is used for determining at least one node configuration such as line cards requiring for supporting network traffic. In another embodiment, network information is used for determining a number of links required for supporting network traffic. As such, the network information is adapted for determining a capital expenditure, an operational expenditure, and like expenditures. In one embodiment, at least a portion of the network information is obtained from at least one remote system such as a network inventory management system, a network provisioning system, and like systems, in communication with a system on which at least a portion of the methodologies of the present invention are performed.

At step 504, a link type associated with each of at least one aggregating access link is determined. In one embodiment, as described herein, an aggregating access link comprises a link between a base station located within an aggregated cell and an aggregating node. At step 506, a link type associated with each of at least one aggregating backhaul link is determined. In one embodiment, an aggregating backhaul link comprises a link between an aggregating node and a deaggregating node.

At step 508, an aggregating node capital expenditure is determined using the link type associated with each of the at least one aggregating access links, the link type associated with each of the at least one aggregating backhaul link, and at least one pricing model. In one embodiment, the aggregating node capital expenditure is computed using a number of each type of aggregating access link and a number of each type of aggregating backhaul link.

At step 510, a link type associated with each of at least one deaggregating link is determined. In one embodiment, a deaggregating link comprises a link between a deaggregating node and at least one network. At step 512, a deaggregating node capital expenditure is determined using the link type associated with each of the at least one aggregating backhaul link, the link type associated with each of the at least one deaggregating link, and at least one pricing model. In one embodiment, the deaggregating node capital expenditure is computed using a number of each type of aggregating backhaul link and a number of each type of deaggregating link.

At step 514, a total capital expenditure is determined using the aggregating node capital expenditure and the deaggregating node capital expenditure. In one embodiment, the total capital expenditure comprises an optimized capital expenditure. In one embodiment, an original capital expenditure associated with an original non-optimized network such as the wireless backhaul network depicted and described with respect to FIG. 1, is obtained such as as an input from the service provider, computed using at least a portion of the methodologies of the present invention, and the like. In one further embodiment, a capital expenditure savings is computed as a difference between the original capital expenditure and the optimized capital expenditure.

At step 516, a determination is made as to whether the links (or at least a portion of the links) of the backhaul network are owned by the wireless service provider. In one embodiment, an operational expenditure comprises an equipment-based operational expenditure and a link-based operational expenditure. In one embodiment, computation of a link-based operational expenditure varies with the owner of the links such as whether the links are owned by the wireless service provider or a third party provider. If the links of the backhaul network are owned by the wireless service provide, method 500 proceeds to step 518. If the links of the backhaul network are not owned by the wireless service provider, i.e., the links are owned by a third party provider, the method 500 proceeds to step 522.

At step 518, a non-aggregated operational expenditure is determined. In one embodiment, the non-aggregated operational expenditure is computed using at least one equipment-based operational expenditure and at least one link-based operational expenditure. In one embodiment, the at least one link-based operational expenditure is determined by applying at least one maintenance pricing model to at least one non-aggregated link. At step 520, an aggregated operational expenditure is determined. In one embodiment, the aggregated operational expenditure is computed using at least one equipment-based operational expenditure and at least one link-based operational expenditure. In one embodiment, the at least one link-based operational expenditure is determined by applying at least one maintenance pricing model to at least one aggregating access link and at least one aggregating backhaul link. The method 500 then proceeds to step 532.

At step 522, at least one non-aggregated link tariff associated with each of at least one non-aggregated link is determined. In one embodiment, a non-aggregated link comprises a link between a base station associated with a non-aggregated cell and at least one network element in communication with a deaggregating node. In one embodiment, the at least one non-aggregated link tariff is computed using at least one tariff structure. In one such embodiment, in which the tariff structure comprises a step function, links of length less than X comprise cost A and links of length greater than X comprise cost B, where cost A is less than cost B. At step 524, a non-aggregated operational expenditure is determined using the at least one non-aggregated link tariff and at least one equipment-based operational expenditure. In one embodiment, a non-aggregated operational expenditure is computed using a number of each category of non-aggregated link, where each category of non-aggregated link comprises a link type and a link length.

At step 526, at least one aggregating access link tariff associated with each of the at least one aggregating access link is determined. In one embodiment, the at least one aggregating access link tariff is computed using at least one tariff structure as described herein. At step 528, at least one aggregating backhaul link tariff associated with each of the at least one aggregating back haul link is determined. In one embodiment, the at least one aggregating backhaul link tariff is computed using at least one tariff structure as described herein.

At step 530, an aggregated operational expenditure is determined using the at least one aggregating access link tariff, the at least one aggregating backhaul link tariff, and at least one equipment-based operational expenditure. In one embodiment, an aggregated operational expenditure is computed using a number of each category of aggregating access link and a number of each category of aggregating backhaul link (where each category of aggregating access link and aggregating backhaul link comprises a link type and a link length). At step 532 a total operational expenditure is determined using the non-aggregated operational expenditure and the aggregated operational expenditure. The method 500 then proceeds to step 534 where method 500 ends.

In one embodiment, computation of capital expenditure, operational expenditure, and like parameters is performed using various combinations of input parameters. In one embodiment, at least a portion of the input parameters are obtained from at least one management system such as a provisioning system, a management system, and the like, in communication with the wireless backhaul network analyzed for optimization. In another embodiment, at least a portion of the input parameters are obtained such as discovered, directly from the wireless backhaul network analyzed for optimization. In still another embodiment, at least a portion of the input parameters are obtained from the wireless service provider.

For example, one input parameter comprises a region type such as dense urban, urban, suburban, rural, and the like, associated with a region. For example, another input parameter comprises a total number of base stations associated with at least one of a network, a country, a region, and the like. For example, another input parameter comprises a region area such as 400 square miles, 12,000 square miles, 30,000 square miles, and the like, associated with a region. For example, another input parameter comprises average peak traffic generated by a base station. In one embodiment, the average peak traffic generated by a base station varies over at least one of a country, a region, a cluster, and the like. Furthermore, the average peak traffic varies according to region type and technology type. For example, the average peak traffic associated with a rural GSM base station comprises 48 voice channels (at 16 Kbps each), the average peak traffic associated with a rural GPRS base station comprises 900 Kbps, the average peak traffic with a rural UMTS NODE-B comprises 1152 Kbps, and the like.

For example, another input parameter comprises traffic growth per technology type. In one embodiment, traffic growth per technology type is measured as an annual percentage. For example, another input parameter comprises a cluster area associated with a cluster. In one embodiment, in which a cluster is assumed to be circular, the cluster area is computed using a cluster radius, where the cluster radius comprises a maximum distance between an aggregation point, i.e., a location of an AN, and a base station. In one embodiment, a cluster area comprises a function of a tariff structure.

For example, another input parameter comprises at least one tariff structure. In one embodiment, a tariff structure comprises an association between at least one link type and at least one associated tariff cost. In another embodiment, a tariff structure is modeled as a step function according to link length. For example, a first tariff may comprise a tariff for a link comprising a length less than length X such as for aggregating access links. Similarly, a second tariff may comprise a tariff for a link comprising a length greater than length X such as for aggregating backhaul links and non-aggregated links. In one such embodiment, the step in tariff cost (from lower cost associated with a short link to higher cost associated with a longer link) occurs at link length equal to a cluster radius. Although described herein with respect to one step, in one embodiment, a tariff structure may comprise a plurality of distinct steps in cost.

For example, another input parameter comprises an aggregation fraction. As described herein, an aggregation fraction comprises a fraction of cell sites operable for being aggregated. In one embodiment, the aggregation fraction is utilized for minimizing respective errors associated with assumptions of the circularity of cell sites and the homogeneity of the radii of the cell sites. For example, another input parameter comprises a number of de-aggregation sites per region. In one embodiment, a number of deaggregating nodes associated with a region is equal to the number of de-aggregation sites associated with a region, i.e., each BTL comprises one DN. In one embodiment, the input parameters described herein, as well as various other input parameters not described herein, are utilized for performing the methodologies of the present invention.

In one further embodiment, computation of CAPEX, OPEX, and like financial parameters, is performed using various combinations of intermediate outputs. In one embodiment, the intermediate outputs are computed using at least a portion of the input parameters, intermediate outputs, and the like, as described herein. For example, one intermediate output comprises a cell area associated with a region. For example, another intermediate output comprises a number of clusters associated with a region. For example, another intermediate output comprises a number of cells associated with a cluster for each cluster associated with a region. For example, another intermediate output comprises a number of aggregated cells and a number of non-aggregated cells. For example, another intermediate output comprises link types, i.e., a technology type, a link rate, and the like, of links terminating on an aggregating node, a deaggregating node, a BSC, an ADM, and like network elements.

For example, other intermediate outputs comprise a number of aggregating nodes, aggregating node configurations, a number of deaggregating nodes, deaggregating node configurations, and the like. For example, other intermediate outputs comprise an aggregating node capital expenditure, a deaggregating node capital expenditure, and the like. For example, another intermediate output comprises an operational expenditure associated with links between base stations and ANs, and operational costs associated with links between ANs and DNs, and operational costs associated with links between DNs and associated transport networks, operational expenditures associated with links between wireless towers and network elements located within BTLs, and the like.

Figure 6:
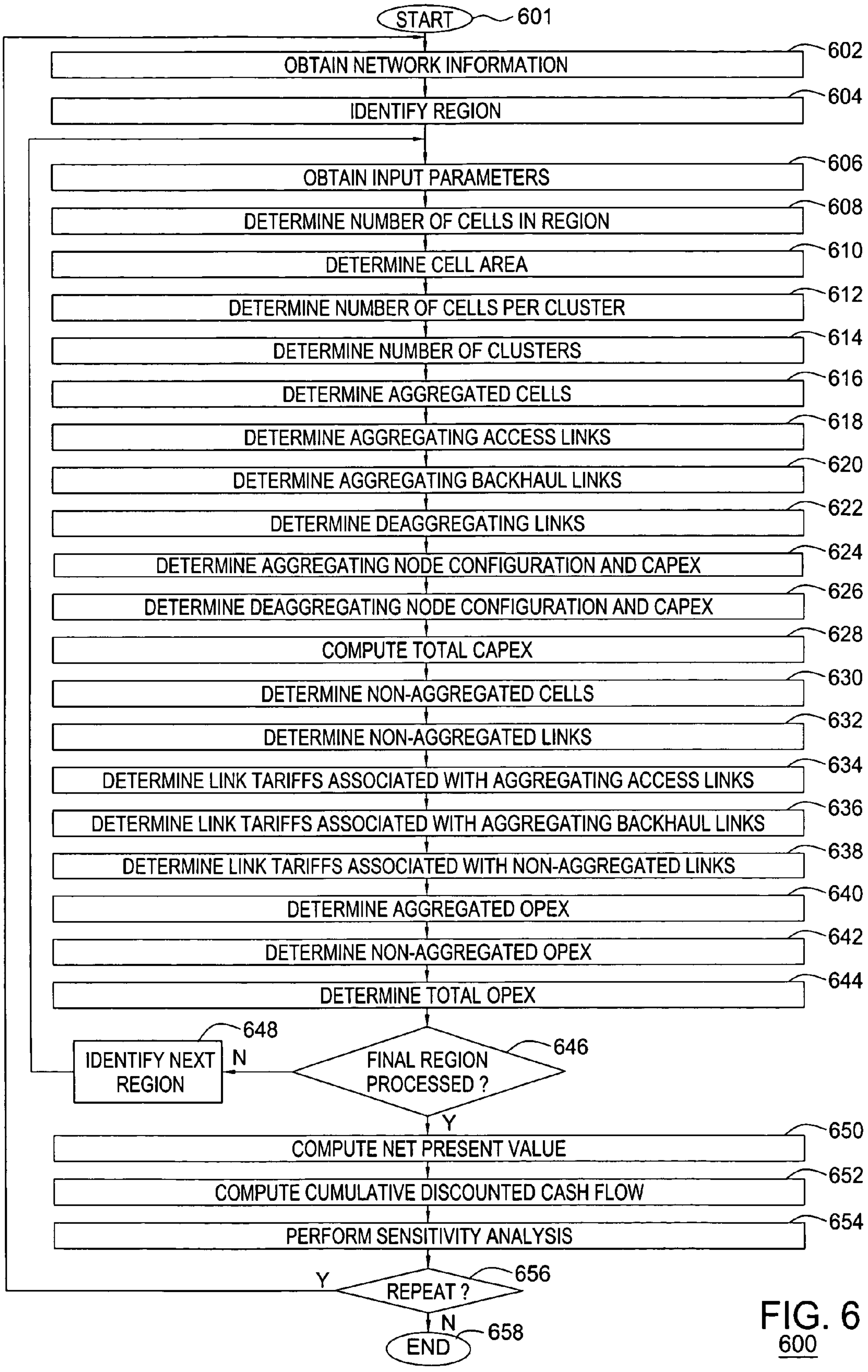
FIG. 6 depicts a flow diagram of a method according to one embodiment of the invention.

FIG. 6 depicts a flow diagram of a method according to one embodiment of the invention. Specifically, method 600 of FIG. 6 comprises a method for computing at least one expenditure associated with a network. Although a portion of the steps are depicted as being performed serially, those skilled in the art will appreciate that at least a portion of the steps of method 600 may be performed contemporaneously, as well as in a different order than presented in FIG. 6. The method 600 is entered at step 601 and proceeds to step 602.

At step 602, network information is obtained. In one embodiment, network information is used for determining at least one node configuration such as line cards requiring for supporting network traffic. In another embodiment, network information is used for determining a number of links required for supporting network traffic. As such, the network information is adapted for determining a capital expenditure, an operational expenditure, and like expenditures. In one embodiment, at least a portion of the network information is obtained from at least one remote system such as a network inventory management system, a network provisioning system, and like systems, in communication with a system on which at least a portion of the methodologies of the resent invention are performed.

At step 604, a region is identified. In one embodiment, a region is representative of a region type. For example, in one embodiment, the identified region represents all suburban regions in the associated country. As such, at least a portion of method 600 of FIG. 6 may be repeated for other region types of the associated country such as rural, urban, and the like. At step 606, input parameters are obtained. In one embodiment, at least a portion of the input parameters comprise a total base station count, a cluster area, a region area, an aggregation fraction, a base station utilization, a set of standard link types, a number of deaggregation sites, an equipment pricing model, a tariff structure, and like input parameters as described herein.

At step 608, a number of cells in the region is determined. In one embodiment, the number of cells in the region is computed using the total number of base stations in the associated country, the region area, and a total area. In one such embodiment, the number of cells in the region is computed as follows: number of cells in region=(total base stations)*(region area)/(total area). At step 610, a cell area is determined. In one embodiment, the cell area is determined using the number of cells in the region and the region area. In one such embodiment, the cell area is computed as follows: cell area=(region area)/(number of cells in region). At step 612, a number of cells per cluster is determined. In one embodiment, the number of cells per cluster is computed using a cluster area and the cell area. In one such embodiment, the number of cells per cluster is computed as follows: cells per cluster=$\pi R^2_{CLUSTER}$/(cell area).

At step 614, a number of clusters associated with the region is determined. In one embodiment, the number of clusters associated with the region is computed using the region area and the cluster area. In one such embodiment, the number of clusters associated is computer as follows: number of clusters=(region area)/(cluster area). At step 616, aggregated cells are determined. In one embodiment, determination of the aggregated cells comprises determining a number of aggregated cells. In one such embodiment, the number of aggregated cells is computed using the number of cells per cluster and the aggregation fraction. In one such embodiment, the number of aggregated cells is computed as follows: (number of cells per cluster)*(aggregation fraction).

At step 618, the aggregating access links are determined. In one embodiment, aggregating access links are determined using at least one link type and a base station utilization associated with each of the base stations located within an aggregated cell, i.e., each base station in communication with an aggregating node. At step 620, the aggregating backhaul links are determined. In one embodiment, aggregating backhaul links associated with an aggregating node are determined using the aggregating access links associated with that aggregating node. In other words, the aggregating backhaul links must provide enough capacity to support the traffic carried over the aggregating access links associated with that aggregating node. At step 622, the deaggregating links are determined. In one embodiment, the deaggregating links associated with a deaggregating node are determined using the aggregating backhaul links associated with that deaggregating node. In other words, the deaggregating links must provide enough capacity to support the traffic carried over the aggregating backhaul links associated with that deaggregating node.

At step 624, an aggregating node configuration and associated aggregating node capital expenditure are determined. In one embodiment, the aggregating node capital expenditure is computed using the aggregating node configuration and at least one pricing model. At step 626, a deaggregating node configuration and associated deaggregating node capital expenditure are determined. In one embodiment, the deaggregating node capital expenditure is computed using the deaggregating node configuration and at least one pricing model. In one embodiment, as described herein, a pricing model comprises a relationship between link type, port type, and port type cost.

At step 628, a total capital expenditure is computed. In one embodiment, a total capital expenditure is computed using the aggregating node capital expenditure and the deaggregating node capital expenditure. In one embodiment, computing the total capital expenditure comprises determining a number of links associated with each of at least one link type for each of the at least one aggregating node and deaggregating node, and computing the total capital expenditure using the number of links associated with each of the at least one link type and a cost associated with each of the at least one link type, where the cost associated with each of the at least one link type is determined using at least one pricing model. In one such embodiment, the number of links associated with each of the at least one link type is determined using at least one base station link type and a base station utilization associated with each of the at least one base station associated with the at least one aggregating node.

At step 630, non-aggregated cells are determined. In one embodiment, determination of the non-aggregated cells comprises determining a number of non-aggregated cells. In one such embodiment, the number of non-aggregated cells is computed using the number of cells per cluster and the aggregation fraction. In one such embodiment, the number of non-aggregated cells is computed as follows: (number of cells per cluster)*(1-(aggregation fraction)).

At step 632, the non-aggregated links are determined. In one embodiment, non-aggregated links are determined using at least one link type and a base station utilization associated with each of the base stations located within a non-aggregated cell, i.e., each base station in communication with a network element associated with a deaggregating node. In other words, non-aggregated links comprise links between base stations and at least one network element (other than a deaggregating node) located in a backhaul termination location such as a BSC for GSP/GRPS traffic, an ADM for UMTS traffic, and the like.

At step 634, the link tariffs associated with the aggregating access links are determined. At step 636, the link tariffs associated with the aggregating backhaul links are determined. At step 638, the link tariffs associated with the non-aggregated links are determined. In one embodiment, a link tariff is determined to according to at least one tariff structure. In one embodiment, a tariff structure comprises a linear function of the length of the associated link. In another embodiment, a tariff structure comprises a step function such that links of length less than X comprise cost A and links of length greater than X comprise cost B (where cost A is less than cost B). In one embodiment, a tariff structure comprises a plurality of step functions.

At step 640, an aggregated operational expenditure is determined. At step 642, a non-aggregated operational expenditure is determined. At step 644, a total operational expenditure is determined. In one embodiment, total operational expenditure is computed using the aggregated operational expenditure and the non-aggregated operational expenditure. At step 646, a determination is made as to whether a final region is processed. If the final region is not processed, method 600 proceeds to step 648. For example, if expenditure savings is computed for a country, steps 606-644 are performed for each region associated with that country such as for an urban region, a suburban region, a rural region, and the like. At step 648, a next region is identified such as process the suburban region next. The method 600 then returns to step 606, at which point at least a portion of the input parameters are obtained. If a final region is processed, method 600 proceeds to step 650.

At step 650, a net present value (NPV) is computed. At step 652, a cumulative discounted cash flow (CDCF) is computed. At step 654, a sensitivity analysis (SA) is performed. In one embodiment, at least one of the NPV, CDCF, and SA is determined according to at least one of the total capital expenditure and the total operational expenditure. Furthermore, in one embodiment, at least one of the MPV, CDCF, and the SA is determined for at least one of a cluster, a plurality of clusters, a region, a plurality of regions, a country, a plurality of countries, a network, a plurality of networks, a year, a plurality of years, and the like.

At step 656, a determination is made as to whether the method 600 of FIG. 6 is repeated. In one embodiment, method 600 of FIG. 6 is repeated for at least one of the same region, at least one different region, the same country, at least one different country, the same network, at least one different network, the same year, at least one different year, and the like. If method 600 is repeated, method 600 returns to step 604. If method 600 is not repeated, method 600 proceeds to step 658, where method 600 ends.

It is contemplated that at least a portion of the described functions may be combined into fewer functional elements. Similarly, it is contemplated that various functions may be performed by other functional elements, or that the various functions may be distributed across the various functional elements in a different manner. Furthermore, although primarily described herein with respect to OTN networks and signals and SONET/SDH networks and signals, those skilled in the art will appreciate that the present invention may be used for synchronous switching of different signals in various other networks and network topologies.

Figure 7:
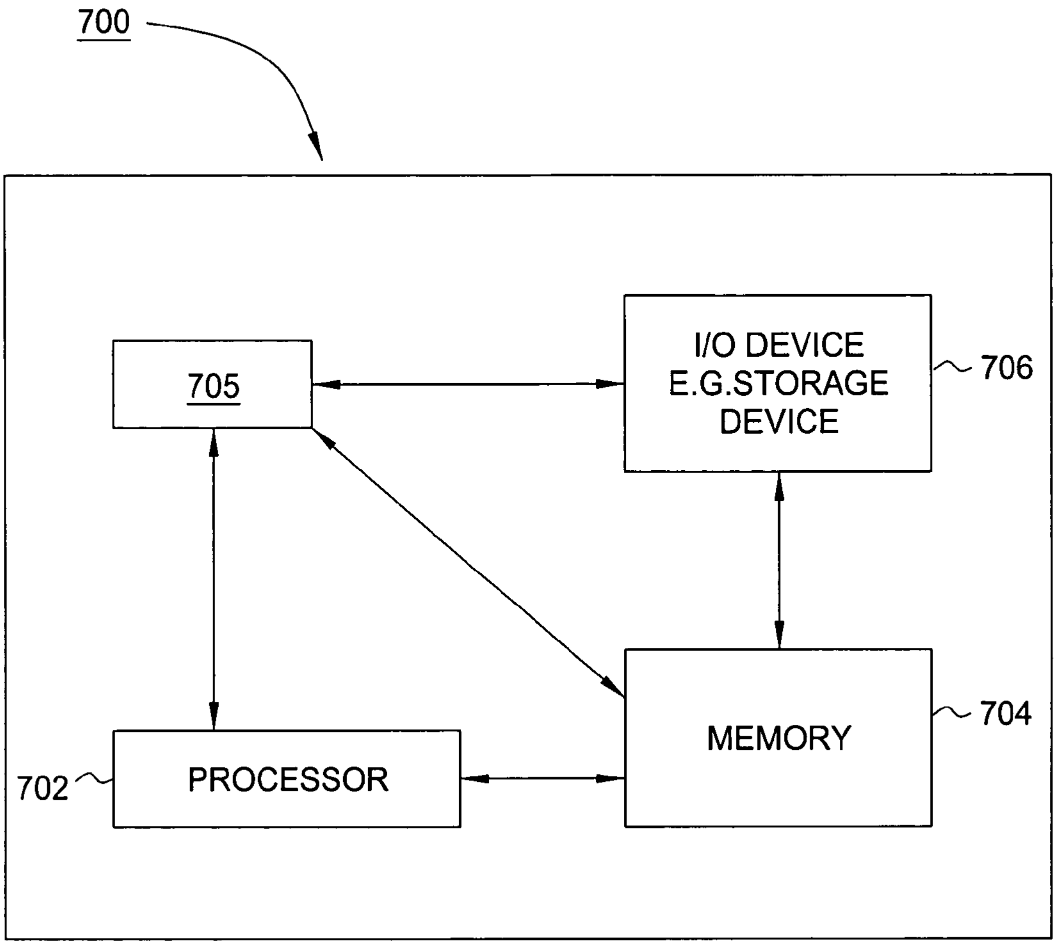
FIG. 7 depicts a high-level block diagram of a general-purpose computer suitable for use in performing the functions described herein.

Although described herein with respect to an embodiment in which aggregating access links, aggregating backhaul links, and like links are owned by a third party provider (thereby requiring use of at least one tariff structure for computing associated operational expenditures), in another embodiment, at least a portion of the aggregating access links, aggregating backhaul links, and like links may be owned by the wireless service provider. In one such embodiment, as described herein, the link-based portion of the operational expenditure comprises the costs incurred by the wireless service provider in maintaining the link. In one such embodiment, the link-based operational expenditure is computed using at least one maintenance pricing model FIG. 7 depicts a high level block diagram of a general purpose computer suitable for use in performing the functions described herein. As depicted in FIG. 7, system 700 comprises a processor element 702 such as a CPU, a memory 704 such as random access memory (RAM) and/or read only memory (ROM), an expenditure computation module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware such as using application specific integrated circuits (ASIC), a general purpose computer or any other hardware equivalents. In one embodiment, the present expenditure computation module or process 705 can be loaded into memory 704 and executed by processor 702 to implement the functions as discussed above. As such, the expenditure computation process 705 (including associated data structures) of the present invention can be stored on a computer readable medium or carrier such as RAM memory, magnetic or optical drive or diskette and the like.

Although various embodiments that incorporate the teachings of the present invention have been shown and described in detail herein, those skilled in the art can readily devise many other varied embodiments that still incorporate these teachings.

What is claimed is:

1. A method for determining an expenditure for a portion of a network, comprising:

modeling the network as one or more regions, each region including a plurality of base stations defining thereby respective cells, each region having a respective average traffic volume;

categorizing each cell as one of an aggregated cell or a non-aggregated cell;

determining a configuration for an aggregating node, the aggregating node being associated with at least one aggregated cell base station, the aggregating node configuration representing a traffic volume required to be supported by the aggregating node; and determining the expenditure using the aggregating node configuration.

2. The method of claim 1, wherein determining an aggregating node configuration further comprises:

computing a number of aggregated cells associated with the aggregating node, the number of aggregated cells representative of a base station density associated with the aggregating node.

3. The method of claim 1, further comprising:

determining a configuration for a deaggregating node associated with the aggregating node, the deaggregating node configuration representing a traffic volume required to be supported by the deaggregating node; and determining the expenditure using at least one of the aggregating and deaggregating node configurations.

4. The method of claim 3, wherein the computing the number of aggregated cells comprises:

computing a number of cells associated with the region of the network using a number of base stations associated with the region, an area of the region, and an area of the network;

computing a cell area using the number of base stations and the area of the region;

computing a cluster radius associated with each of at least one cluster in the region using at least one tariff structure and an aggregation fraction, the aggregation fraction comprising a percentage of the number of base stations in communication with the aggregating node;

computing a number of cells associated with the each of the at least one cluster in the region using the cluster radius and the cell area; and computing the number of aggregated cells using the number of cells associated with each of the at least one cluster and the aggregation fraction.

5. The method of claim 3, wherein the expenditure comprises a capital expenditure.

6. The method of claim 5, wherein the determining the capital expenditure comprises:

applying a pricing model to the aggregating node configuration and the deaggregating node configuration, wherein the pricing model comprises a plurality of costs associated with a respective plurality of line card types.

7. The method of claim 5, wherein:

the determining the aggregating node configuration further comprises:

determining a card type associated with each of a plurality of aggregating access links, wherein each aggregating access link comprises a link between the aggregating node and a base station associated with an aggregated cell; and determining a card type associated with each of a plurality of aggregating backhaul links, wherein each aggregating backhaul link comprises a link between the aggregating node and the deaggregating node; and the determining the deaggregating node configuration further comprises:

determining a card type associated with each of the plurality of aggregating backhaul links; and determining a card type associated with each of a plurality of deaggregating links, wherein each deaggregating link comprises a link between the deaggregating node and at least one network element.

8. The method of claim 2, wherein the expenditure comprises an operational expenditure.

9. The method of claim 8, wherein the determining the operational expenditure further comprises:

determining at least one equipment-based operational expenditure associated with:

at least one aggregating access link between at least one base station associated with at least one aggregated cell and the aggregating node; and at least one aggregating backhaul link between the aggregating node and the deaggregating node;

determining at least one link-based operational expenditure associated with the at least one aggregating access link and the at least one aggregating backhaul link; and determining the operational expenditure using the at least one equipment-based operational expenditure and the at least one link-based operational expenditure.

10. The method of claim 9, wherein the determining the at least one link-based operational expenditure further comprises:

determining, using a tariff structure, at least one aggregating access link tariff associated with each of the at least one aggregating access link;

determining, using the tariff structure, at least one aggregating backhaul link tariff associated with the at least one aggregating backhaul link; and determining the at least one link-based operational expenditure using the at least one aggregating access link tariff and the at least one aggregating backhaul link tariff.

11. The method of claim 9, wherein the operational expenditure comprises an aggregated operational expenditure, wherein the determining the aggregated operational expenditure further comprises:

determining a total number of links for each link type using each of the at least one aggregating access link and each of the at least one aggregating backhaul link; and determining the aggregated operational expenditure using the total number of links for each link type and at least one of a maintenance pricing model or a tariff structure.

12. The method of claim 9, wherein the operational expenditure comprises a non-aggregated operational expenditure, wherein the determining the non-aggregated operational expenditure further comprises:

determining a total number of links for each link type for each base station associated with a non-aggregated cell; and determining the non-aggregated operational expenditure using the total number of links for each link type and at least one of a maintenance pricing model or a tariff structure.

13. The method of claim 1, further comprising:

computing at least one financial parameter using the expenditure;

wherein the at least one financial parameter comprises at least one of a net present value, a cumulative discounted cash flow, and a sensitivity analysis.

14. An apparatus for determining an expenditure for a portion of a network, comprising:

an interface adapted for receiving network information;

a memory coupled to the interface, the memory adapted for storing at least a portion of the received network information; and a processor coupled to the memory, the processor adapted for performing a method comprising:

modeling the network as one or more regions, each region including a plurality of base stations defining thereby respective cells, each region having a respective average traffic volume;

categorizing each cell as one of an aggregated cell or a non-aggregated cell;

determining a configuration for an aggregating node, the aggregating node being associated with at least one aggregated cell base station, the aggregating node configuration representing a traffic volume required to be supported by the aggregating node; and determining the expenditure using the aggregating node configuration.

15. The apparatus of claim 14, further comprising:

determining a configuration for a deaggregating node associated with the aggregating node, the deaggregating node configuration representing a traffic volume required to be supported by the deaggregating node; and determining the expenditure using at least one of the aggregating and deaggregating node configurations.

16. The apparatus of claim 15, wherein the expenditure comprises one of a capital expenditure and an operational expenditure.

17. The apparatus of claim 16, wherein the determining the capital expenditure comprises:

applying at least one pricing model to the aggregating node configuration and the deaggregating node configuration.

18. The apparatus of claim 16, wherein the determining the operational expenditure comprises:

determining at least one equipment-based operational expenditure associated with:

at least one aggregating access link between at least one base station associated with at least one aggregated cell and the aggregating node; and at least one aggregating backhaul link between the aggregating node and the deaggregating node;

determining at least one link-based operational expenditure associated with the at least one aggregating access link and the at least one aggregating backhaul link; and determining the operational expenditure using the at least one equipment-based operational expenditure and the at least one link-based operational expenditure.

19. An apparatus for determining an expenditure for a portion of a network, comprising:

means for modeling the network as one or more regions, each region including a plurality of base stations defining thereby respective cells, each region having a respective average traffic volume;

means for categorizing each cell as one of an aggregated cell or a non-aggregated cell;

means for determining a configuration for an aggregating node, the aggregating node being associated with at least one aggregated cell base station, the aggregating node configuration representing a traffic volume required to be supported by the aggregating node; and means for determining the expenditure using the aggregating node configuration.

20. The apparatus of claim 19, wherein the expenditure comprises one of a capital expenditure and an operational expenditure.

21. The apparatus of claim 19, wherein the means for determining the capital expenditure further comprises:

means for applying at least one pricing model to the aggregating node configuration and the deaggregating node configuration.

22. The apparatus of claim 20, wherein the means for determining the operational expenditure further comprises:

means for determining at least one equipment-based operational expenditure associated with:

at least one aggregating access link between at least one base station associated with at least one aggregated cell and the aggregating node; and at least one aggregating backhaul link between the aggregating node and the deaggregating node;

means for determining at least one link-based operational expenditure associated with the at least one aggregating access link and the at least one aggregating backhaul link; and means for determining the operational expenditure using the at least one equipment-based operational expenditure and the at least one link-based operational expenditure.

* * * * *